(No Model.)
H. BAUMGARTEN.
TAG.
No. 444,739. Patented Jan. 13, 1891.
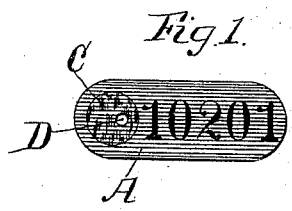
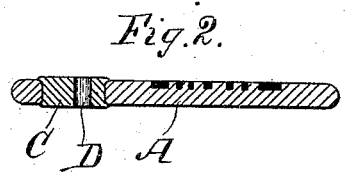
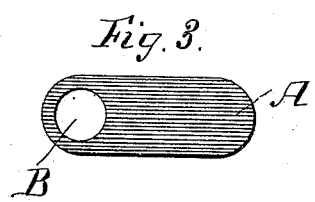
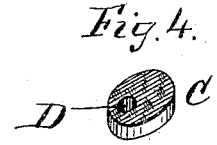
WITNESSES
INVENTOR
Herman Baumgarten

UNITED STATES PATENT OFFICE.

HERMAN BAUMGARTEN, OF WASHINGTON, DISTRICT OF COLUMBIA.

TAG.

SPECIFICATION forming part of Letters Patent No. 444,739, dated January 13, 1891.

Application filed October 30, 1890. Serial No. 369,838. (No model.)

*To all whom it may concern:*

Be it known that I, HERMAN BAUMGARTEN, a citizen of the United States, residing in the city of Washington and District of Columbia, have invented a new and useful Improvement in Metallic Tags; and I do hereby declare the following to be a sufficiently full, clear, and exact description thereof to enable others skilled in the art to make and use the said invention.

This invention relates to tags for attaching to articles of commerce and to animals for the purpose of identification, and has for its object greater durability, and is specially useful in marking cattle.

The improvement consists in the strengthening of the eye of the tag by which it is suspended by a wire or other tie.

The manner of making and the form of this improved tag is hereinafter fully described, and is shown in the accompanying drawings, in which—

Figure 1 shows a plan of the tag; Fig. 2, a central lengthwise section thereof, enlarged; Fig. 3, a tag before the eye has been strengthened, and Fig. 4 the piece of metal used to bush or strengthen the eye.

The same reference-marks indicate like parts in the several figures.

A represents the plate of metal forming the tag, which for the purpose of being readily marked should be ductile, and for economy of material is preferably but not necessarily made with parallel sides and rounded ends or corners. At one end of the plate A is formed a hole B considerably larger than the desired eye in the tag.

C is a plug of harder metal having an opening D in it eccentric to its circumference and of a length, measured in the direction of its axis, sufficient when inserted in the hole B in the plate A to project slightly on each side. The diameter of the plug C is such as to fill the hole B in the plate A. The plug C is inserted in the hole B and the edges or rim of it expanded by pressure applied by suitable dies, so that they impinge upon and extend over the softer metal of the plate A and hold the plug firmly in the hole B. The hole D in the bush or plug C is turned toward the center of length of the tag, so as to expose the greatest extent of the metal of the bushing to wear upon the wire or other tying material.

By making the bushings in the form described I am enabled to make them of steel having great durability for wear upon the tying-wire and yet to retain the soft ductile properties of the tag so convenient and necessary for convenient marking.

I am aware that metallic marking-tags have been made with the eyes thereof re-enforced and strengthened by a plate of harder metal soldered upon the side surrounding the eye. These were objectionable because the wire used for tying wore out the ductile metal on the sides and the solder became detached and the tag lost, and are not herein claimed; but What I do claim is—

A metallic tag formed of ductile metal capable of being impressed, having a bushing of harder metal inserted in one end thereof and expanded therein, with the eccentric hole in said bushing located toward the center of the tag, so as to subject the thick side of the bushing to wear when suspended by a wire, substantially as set forth.

HERMAN BAUMGARTEN.

Witnesses:

WARREN C. STONE,
H. M. KENDRICK.